US009933063B2

(12) United States Patent
Ognibene

(10) Patent No.: US 9,933,063 B2
(45) Date of Patent: Apr. 3, 2018

(54) SILENT SPROCKET/GEAR FOR TRANSMISSION CHAINS, IN PARTICULAR FOR MOTORCYCLES, AND MOLD COMPONENTS FOR ITS PRODUCTION

(71) Applicant: OGNIBENE S.P.A., Bologna (IT)

(72) Inventor: Franco Ognibene

(73) Assignee: Ognibene S.P.A., Bologna (IT)

( * ) Notice: Subject to any disclaimer, the term of this patent is extended or adjusted under 35 U.S.C. 154(b) by 0 days.

(21) Appl. No.: 15/102,084

(22) PCT Filed: Dec. 2, 2014

(86) PCT No.: PCT/EP2014/076298
§ 371 (c)(1),
(2) Date: Jun. 6, 2016

(87) PCT Pub. No.: WO2015/082494
PCT Pub. Date: Jun. 11, 2015

(65) Prior Publication Data
US 2017/0067551 A1    Mar. 9, 2017

(30) Foreign Application Priority Data
Dec. 5, 2013 (IT) .............................. RM2013A0672

(51) Int. Cl.
*F16H 55/06* (2006.01)
*F16H 55/14* (2006.01)
*F16H 55/30* (2006.01)

(52) U.S. Cl.
CPC .............. *F16H 55/14* (2013.01); *F16H 55/06* (2013.01); *F16H 55/30* (2013.01); *F16H 2055/306* (2013.01)

(58) Field of Classification Search
CPC ...... F16H 55/30; F16H 2055/306; F16H 7/06; F16H 2055/366; F16H 55/36
(Continued)

(56) References Cited

U.S. PATENT DOCUMENTS 975,938 A * 11/1910 Downey ................. F16H 55/30
474/161
1,894,432 A * 1/1933 Watson ..................... E21B 1/02
152/49
(Continued)

FOREIGN PATENT DOCUMENTS

JP     S6061554 U    4/1985
JP     S63214566 A   9/1988
(Continued)

OTHER PUBLICATIONS

International Search Report regarding Application No. PCT/EP2014/076298, dated Apr. 29, 2015.
(Continued)

*Primary Examiner* — Henry Y Liu
(74) *Attorney, Agent, or Firm* — Harness, Dickey & Pierce, P.L.C.

(57) ABSTRACT

A silenced sprocket comprises, adjacent to the base of its teeth, a circular channel, or bilateral channel, on the metal body of the sprocket itself. The bilateral channel has a minimal radial extension, a silencing rubber element (106'), and a bilateral channel. The bilateral channel creates its own housing and has a minimal radial extension compared to the sprocket radius. The silenced sprocket is made by a molding technique that uses special molding components, adapted to apply the rubber silencing element on the sprocket metal body. These components are of annular circular shape, U cross section and a width essentially corresponding to the channel width, rendering the mold independent from the specific shape of the sprocket metal body.

17 Claims, 11 Drawing Sheets

(58) Field of Classification Search
USPC .................................................. 474/161, 94
See application file for complete search history.

(56) References Cited

U.S. PATENT DOCUMENTS

| | | | | |
|---|---|---|---|---|
| 2,674,897 A * | 4/1954 | Heinish | F16H 55/50 152/41 |
| 2,953,930 A * | 9/1960 | Meyer | F16H 7/06 474/148 |
| 3,101,214 A * | 8/1963 | Talboys | B60B 17/0044 105/198.7 |
| 4,261,214 A * | 4/1981 | Watanabe | B62M 9/00 474/151 |
| 4,332,574 A * | 6/1982 | Aoyama | F16H 55/30 474/161 |
| 4,348,199 A * | 9/1982 | Oonuma | F16H 55/14 305/199 |
| 4,867,733 A * | 9/1989 | Yamanoi | B62M 9/00 474/161 |
| 5,224,903 A * | 7/1993 | Langhof | B62M 9/00 474/152 |
| 5,360,378 A * | 11/1994 | Suzuki | F16H 7/06 474/161 |
| 5,540,626 A * | 7/1996 | Asai | F16F 15/124 474/178 |
| 5,591,093 A * | 1/1997 | Asai | F16D 3/76 474/902 |
| 5,843,264 A * | 12/1998 | Mabuchi | F16F 1/44 156/219 |
| 5,908,364 A * | 6/1999 | Tanaka | F16H 7/06 474/148 |
| 5,980,408 A * | 11/1999 | Schulz | F16H 7/06 474/151 |
| 5,984,817 A * | 11/1999 | Schulz | F16H 7/06 474/156 |
| 6,336,882 B1 * | 1/2002 | Ullein | F01L 1/02 474/161 |
| 6,371,874 B1 * | 4/2002 | Inoue | F16H 55/30 474/156 |
| 6,386,065 B1 * | 5/2002 | Hodjat | F16F 15/126 474/94 |
| 6,468,173 B1 * | 10/2002 | Jeong | F16H 55/30 464/77 |
| 6,652,402 B2 * | 11/2003 | Poiret | F16G 13/06 474/156 |
| 6,656,072 B2 * | 12/2003 | Sugita | B62M 7/02 474/156 |
| 6,875,113 B2 * | 4/2005 | Nichols | F16F 15/1442 464/90 |
| 6,910,980 B2 * | 6/2005 | Hamilton | F16H 55/06 474/156 |
| 7,052,424 B2 * | 5/2006 | Kabrich | F16H 55/30 301/30 |
| 7,074,147 B2 * | 7/2006 | Young | F16H 7/06 474/156 |
| 7,232,392 B2 * | 6/2007 | Hamilton | F16H 55/06 474/156 |
| 7,699,733 B2 * | 4/2010 | Sakura | F16H 55/30 474/156 |
| 7,713,156 B2 * | 5/2010 | Sakura | F16H 7/06 474/156 |
| 7,914,408 B2 * | 3/2011 | Young | F16H 7/06 474/152 |
| 7,967,709 B2 * | 6/2011 | Emura | B62M 9/105 474/160 |
| 8,083,624 B2 * | 12/2011 | Young | F16H 7/06 474/100 |
| 8,202,185 B2 * | 6/2012 | Haesloop | F16H 55/30 474/156 |
| 9,145,965 B2 * | 9/2015 | Kwon | F16H 55/30 |
| 2003/0228950 A1 * | 12/2003 | Young | F16G 13/04 474/161 |
| 2004/0166974 A1 * | 8/2004 | Hodjat | F16F 15/126 474/94 |
| 2005/0057097 A1 * | 3/2005 | Wu | F16H 55/14 305/194 |
| 2006/0073927 A1 * | 4/2006 | Haesloop | F16H 55/30 474/161 |
| 2006/0252592 A1 * | 11/2006 | Young | F16H 7/06 474/161 |
| 2007/0093329 A1 * | 4/2007 | Greppi | F16F 15/124 474/152 |
| 2007/0111833 A1 * | 5/2007 | Young | F16H 7/06 474/152 |
| 2007/0265122 A1 * | 11/2007 | Emura | B62M 9/105 474/152 |
| 2008/0171624 A1 * | 7/2008 | Sakura | F16H 55/30 474/156 |
| 2008/0176688 A1 * | 7/2008 | Sakura | F16H 7/06 474/141 |
| 2009/0093329 A1 * | 4/2009 | Markley | F16H 55/30 474/161 |
| 2009/0118047 A1 * | 5/2009 | Haesloop | F16H 55/30 474/161 |
| 2009/0197719 A1 * | 8/2009 | Ali | F16D 7/021 474/94 |
| 2011/0300977 A1 * | 12/2011 | Hayami | F16H 55/30 474/161 |
| 2012/0231909 A1 * | 9/2012 | Shin | F16F 15/126 474/94 |
| 2014/0329629 A1 * | 11/2014 | Vukojicic | F16H 55/36 474/94 |
| 2015/0105196 A1 * | 4/2015 | Lee | F16H 55/36 474/94 |
| 2015/0141182 A1 * | 5/2015 | Mandel | B22F 3/12 474/94 |
| 2016/0003340 A1 * | 1/2016 | Crump | F16H 55/30 474/161 |

FOREIGN PATENT DOCUMENTS

| | | |
|---|---|---|
| JP | 2000198483 A | 7/2000 |
| JP | 2005147340 A | 6/2005 |
| JP | 2008223916 A | 9/2008 |

OTHER PUBLICATIONS

Written Opinion regarding Application No. PCT/EP2014/076298, dated Apr. 29, 2015.

* cited by examiner (a)

(b)

SILENT SPROCKET/GEAR FOR TRANSMISSION CHAINS, IN PARTICULAR FOR MOTORCYCLES, AND MOLD COMPONENTS FOR ITS PRODUCTION

CROSS REFERENCE TO RELATED APPLICATION

This application is a U.S. National Phase under 35 U.S.C. 371 of International Application No. PCT/EP2014/076298, filed Dec. 2, 2014, and published in English as WO 2015/082494 A1 on Jun. 11, 2015. This application is based on and claims the benefit of priority from Italian Patent Application No. RM2013A000672, filed Dec. 5, 2013. The entire disclosures of all of the above applications are incorporated herein by reference.

TECHNICAL FIELD

The present invention refers in general to the industrial fields which produce or use wheel sprockets/gears. More in particular, the present invention concerns sprockets for the transmission of motion in motorcycles and in high-performance motorcycles. Specifically, the invention deals with a way of reducing vibrations generated by a transmission chain, at the tangent and engagement point with the present sprocket, this being for example the rear toothed crown of a motorcycle or the pinion of the gearbox.

PRIOR ART

A technique for the reduction of vibrations in a sprocket is described for example in the Japanese document JP 2000198483 by NIPPON MEKTRON KK.

In general the sprocket called "silent sprocket" has long been known. It constitutes a silenced sprocket for chains. In particular it can comprise two lateral disks of vulcanized rubber, adapted to anticipate the contact of the chain while it engages the sprocket. It is known that in the engagement process, the plates of the chain inner plate compress the rubber (nitrile rubber, NBR, for example) of said lateral disks, for about 1 mm. The rubber has the role of damping the impact, consequently reducing the noise. Said rubber is usually positioned at about 1 mm from the base of the sprocket teeth. Without the rubber, a pin of the inner plate would directly impact the sprocket tooth.

In particular motorcycles have a pinion exiting the engine unit (gearbox exit) and this pinion transmits its rotary motion to the motorcycle toothed crown integral to the rear wheel. Especially when the pinion rotates at high velocity (high engine revolutions), the motion transmission chain, located between the pinion and the toothed crown, generates noise at the tangent or engagement point with the rear wheel toothed crown, said noise caused by the continuous impact between the transmission chain inner plate pins and the various teeth of the toothed crown. The noise increases particularly in high-performance motorcycles, when values of e.g. 4000 rev/min are reached. Now, the level of the noise generated in the described way, on top of being annoying for the motorcycle rider, cannot exceed a specific threshold, otherwise the motorcycle might not pass certification tests.

Efforts made so far to reduce said noise generated by the chain have not yielded appreciable results, considering that generally they only made it possible to pass motorcycle certification tests.

In particular in the motorcycle field, the toothed crown must be replaced usually after 25000 km. At the present state of the art, after some 3000 km the rubber is worn out (thus being useless as explained below), and the noise begins to be heard again as if the rubber was no longer present. Nevertheless, these 3000 km are enough to pass the certification test, even if they don't solve the background problem of eliminating the noise in the long run.

Considering that the motorcycle toothed crown must be replaced after the aforesaid 25000 km, a particular objective of this invention for the motorcycle field is to prolong the duration of the rubber up to at least 10000 km, for example. After said distance, the whole sprocket will have to be replaced, as is not possible to replace only the rubber. There will therefore be the advantage of being able to use one crown and one pinion for a period that is more than twice as long, without hearing annoying noises.

In general, in motion transmission systems comprising chains and sprockets used in the industry, there is nowadays the need to provide a vibration reduction system which will be efficient and will last longer.

The drawbacks of the known art can be more easily understood looking at FIGS. 1 to 5 enclosed to this document.

Referring first of all to FIG. 1 (FIG. 1), it shows a toothed sprocket 1 of the known art before being "vulcanized", that is before the silencing rubber is applied with a process of rubber injection molding and vulcanizing. Sprocket 1 is of the kind with two lateral hubs 2a, 2b. This kind of sprocket corresponds to the aforementioned pinion. It is noted that the two sides 3a, 3b of the sprocket are perfectly planar but have a series of openings (holes) 4, of which only some are numbered in FIG. 1 for simplicity purposes. The holes 4 are through, concentric to the center of sprocket 1, and equally spaced from each other. The sprocket has a plurality of perimeter teeth 5. Sprocket 1 is partially shown in perspective in FIG. 1(a), and in cross section in FIG. 1(b) (the cross section actually corresponding to the front view in FIG. 1(a)).

FIG. 2 instead shows the same toothed sprocket 1 after vulcanization. Currently this kind of vulcanization of sprocket 1 is restricted to the motorcycle field only, and only to such driving sprocket 1, which has the hub (pinion) which offers a support base (see subsequent explanations) where the pressures of the chain (not shown) exerted on the rubber can be discharged (high dynamic forces, especially in high-performance motorcycles).

Referring specifically to FIG. 2, it is shown how the cushioning rubber 6 covers sprocket 1 of FIG. 1 on both sides, along circular sections that extend from almost the base of teeth 5 (usually at a distance of about 1 mm from said teeth 5) to hub 2a, 2b. In FIGS. 2(a) and 2(b) sprocket 1 of FIG. 1 can be seen ideally sectioned in half, diametrically, and it is shown that rubber 6 during the injection molding process penetrated the through holes 4, such that in the section in FIG. 2, also regarding such two through holes 4, it looks like the rubber forms a U shaped ring. Rubber 6 thus forms a single body and stays fixed on both sides, or side sections, 3a, 3b to sprocket 1.

FIG. 3 shows the traditional mold (in two halves 7a, 7b) for the injection and vulcanization of rubber 6. In the cross section in FIG. 3(b) it can be noted that the rubber is injected through the injection orifice 8 (arrow F) and then occupies the whole region shown. Part 7a of mold 7a, 7b does not have injection orifices.

Referring to FIG. 4, it shows advantages and disadvantages of this traditional technique. The transmission chain inner plates (not shown), impacting on the rubber 6 cylindrical annular surfaces 9, prevent the pins of the inner plates from impacting suddenly against the teeth 5, thus absorbing vibrations and noise. FIG. 4(a) corresponds to FIG. 1(a) after the vulcanization of pinion 1. FIG. 4(b) on the right shows detail "A" of FIG. 4(a) enlarged. From FIG. 4(b), in particular, it can be inferred that rubber 6 has a support base on lateral hubs 2a, 2b, or hub 2. The arrows show the discharge/absorbing of the pressure exerted by the chain on rubber 6 and on the support base (central hub 2). The support base for the rubber being necessary (to absorb the pressure of the chain), the whole surface of pinion 1 must then be vulcanized (as shown in the figures). In fact, the only contact point between the chain and the rubber is 2 mm of the section of the chain plate (max. 2.4 mm according to the motorcycle power). The result is a considerable waste of synthetic material, which is also polluting. In contrast, it must be mentioned among the advantages that the support base consisting of the hub 2 guarantees a remarkable duration of the rubber, and therefore of the sprocket.

Finally, in this overview of the known art, the problem of silencing a sprocket of the kind of a toothed crown without a central hub is treated. In this regard, reference is made to FIG. 5 (FIGS. 5(a) and 5(b)). In substance, an attempt was made to apply the same silencing principle on a toothed crown as well, but because of the missing support base (the crown doesn't have a hub), the seal of the rubber 6' cantilevered and on a smooth surface, like the surface of the two sides of toothed crown 1', has proven unreliable. In other words, the continuous shocks transmitted to the annular cylindrical surfaces 9' of rubber 6' from the chain inner plate (not shown), determined the "wearing of the rubber" in the sense of progressive lowering/compression in time, until the condition is equivalent to the total absence of rubber on the toothed crown 1'. The retention force exerted by rubber 6' also injected in the through holes 4' of toothed crown 1' (comparable to the previous through holes 4 of sprocket 1) wasn't enough to oppose this compression effect.

The motorcycle industry had to abandon silenced toothed crowns.

One objective of the present invention is to overcome the abovementioned problems, introducing to the industry, in particular also to the motorcycle industry, silenced sprockets which have a remarkable duration and damping efficiency, which require a minimum of synthetic material (rubber), and which can be manufactured with versatile injection molding devices which can be adapted to different kinds of sprockets.

These objectives will be reached in the manner specified in the appended claims. The dependent claims point out several invention execution variants.

BRIEF DESCRIPTION OF THE DRAWINGS

The Figures show.

DESCRIPTION OF SOME CURRENTLY PREFERRED EMBODIMENTS

The present invention will be described purely as an example, and not in a limitative or binding way, using FIGS. 6 to 11 appended to this document, which concern exclusively the present invention. Such figures show some illustrative embodiments, but they aren't limiting or binding in any way regarding the present inventive concept.

In general, in the following of the present description, all details that are however obvious, or implicitly known, to the average man skilled in the art will be omitted. For example, the methods used to create the bilateral channels of the invention on the sprocket can be of different type, such that is not necessary to describe the manufacturing processes in detail. Also the materials used (different kinds of rubber to be used in the vulcanization of the sprocket or the sprocket material itself, such as quenched steel) can be adapted by the man skilled in the art to the specific application, in order to optimize the results achieved.

Also other technical details must be considered as known to the average man skilled in the art, and won't be treated here.

Furthermore, in FIGS. 6 to 11, as a simplification the same numerical references will be always used to indicate the same components of the claimed product.

In order to distinguish the present invention from the known art of FIGS. 1 to 5, all numerical references in FIGS. 6 to 11 will start from number 100.

Figure 6:
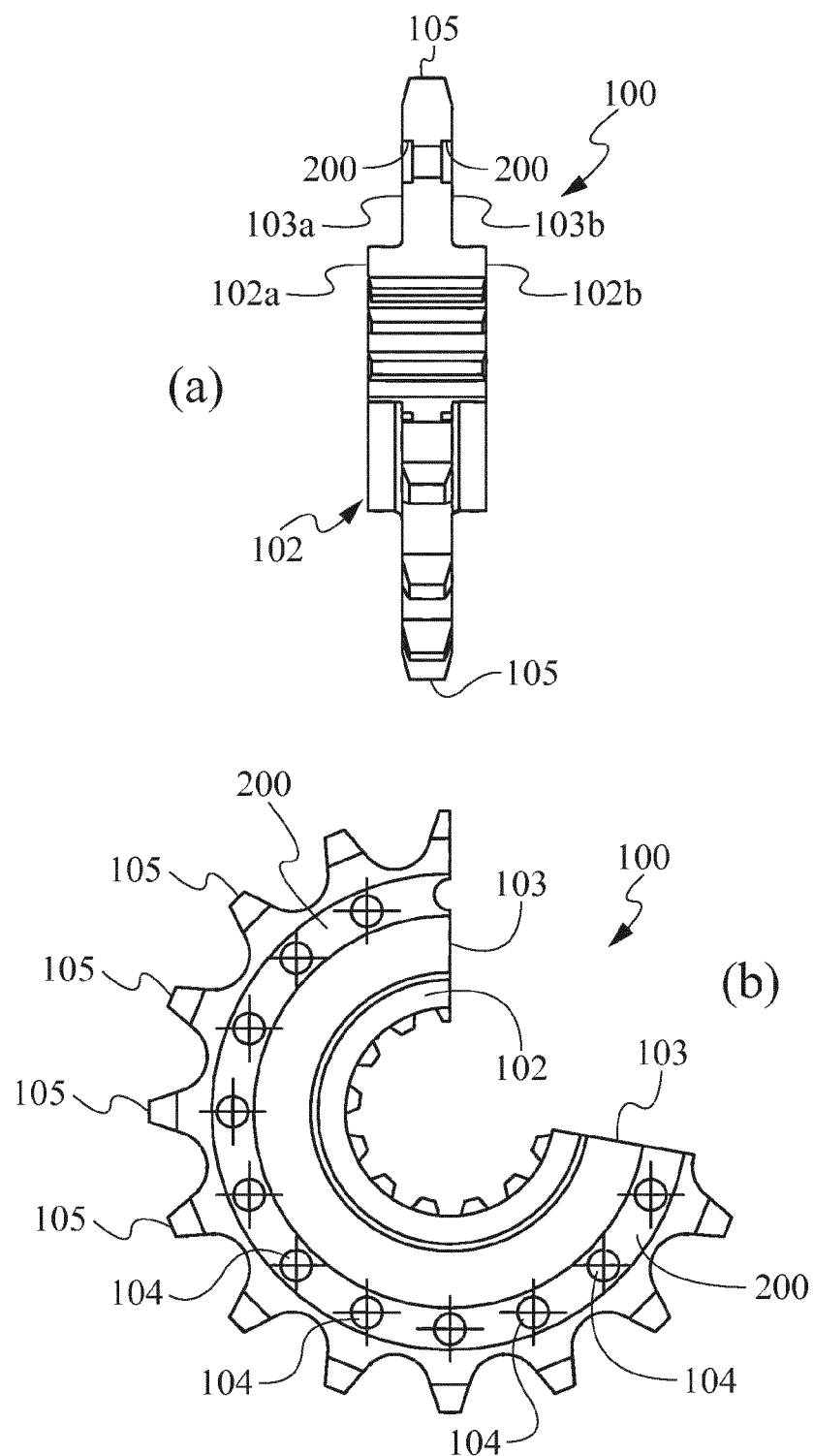
FIGS. 6(a), (b): front and lateral view of a cross section of the sprocket (pinion) before its vulcanization, according to this present invention.

FIG. 6 highlights the different structure of pinion 100 (according to the present invention) from the known art. Indeed, the through holes 104, equidistant and concentric, are now obtained in two circular recesses 200 ("bilateral channel 200") obtained on the two surfaces (sections adjacent to teeth 105) of sprocket 100. By virtue of such circular "channels" 200 realized according to the invention in the corresponding "tooth section" (103a or 103b) of pinion 100, two circular steps (seen in the cross section of FIG. 6(a)) on the "tooth sections" 103a and 103b accordingly are created on each side of pinion 100. The corresponding surfaces (3a and 3b) of pinion 1 of the known art are otherwise smooth (see FIG. 1). As better described below, the aforesaid circular steps allow not having to depend on hub 102 for support.

Figure 7:
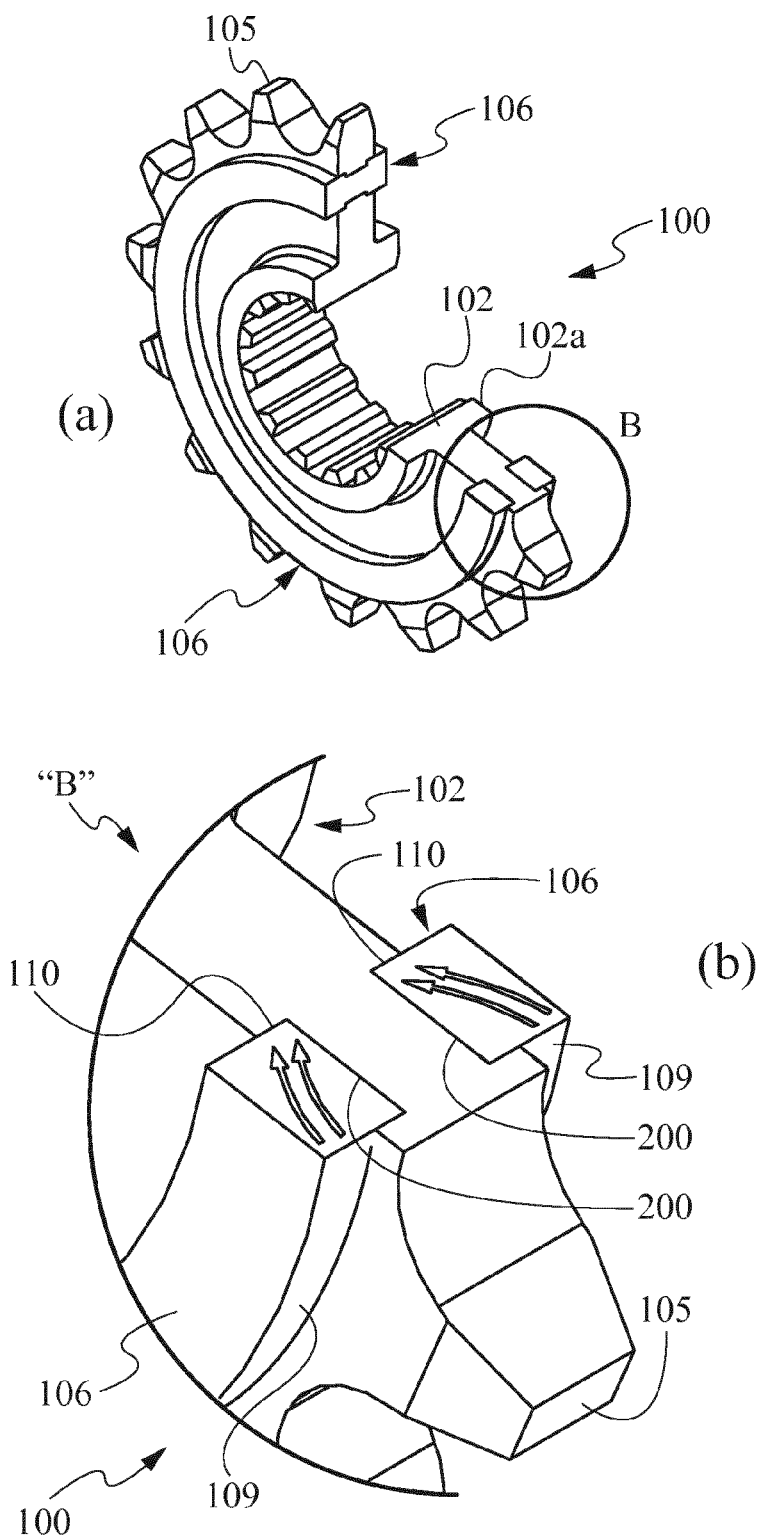
FIG. 7(a): perspective view of the cross section of the pinion according to the invention shown in FIG. 6, after its vulcanization.
FIG. 7(b): enlarged view of the detail highlighted by circle "B" in FIG. 7(a)

FIG. 7 shows the invention pinion 100 after vulcanization and the effect created by the bilateral channel 200 according to the present invention. The housing (of a rectangular profile in cross section) for rubber 106 created by these circular recesses 200, absorbs the thrusts towards the inside (see arrows in FIG. 7(b)) thanks to the presence of the inner circular step 110. Said thrusts, caused by the chain inner plate (not shown), act on the circular cylindrical surfaces 109, but opposite to the toothed crown of the known art (FIG. 5), are now opposed by the inner circular step 110. Step 110, a few millimeters deep, receives such thrusts and is deep enough to sustain the pressure exerted by the chain on rubber 106. Hundreds of tests made in extreme conditions confirmed the total reliability of this system.

Even though (as in the known art) rubber 106 entering the through holes 104 during the injection molding forms a solid body, thus giving some retention effect of rubber 106 itself on sprocket 100, such effect doesn't allow, or is anyway insufficient for avoiding the compression of the rubber circular cylindrical surfaces 109 caused by the chain pressure.

Figure 8:
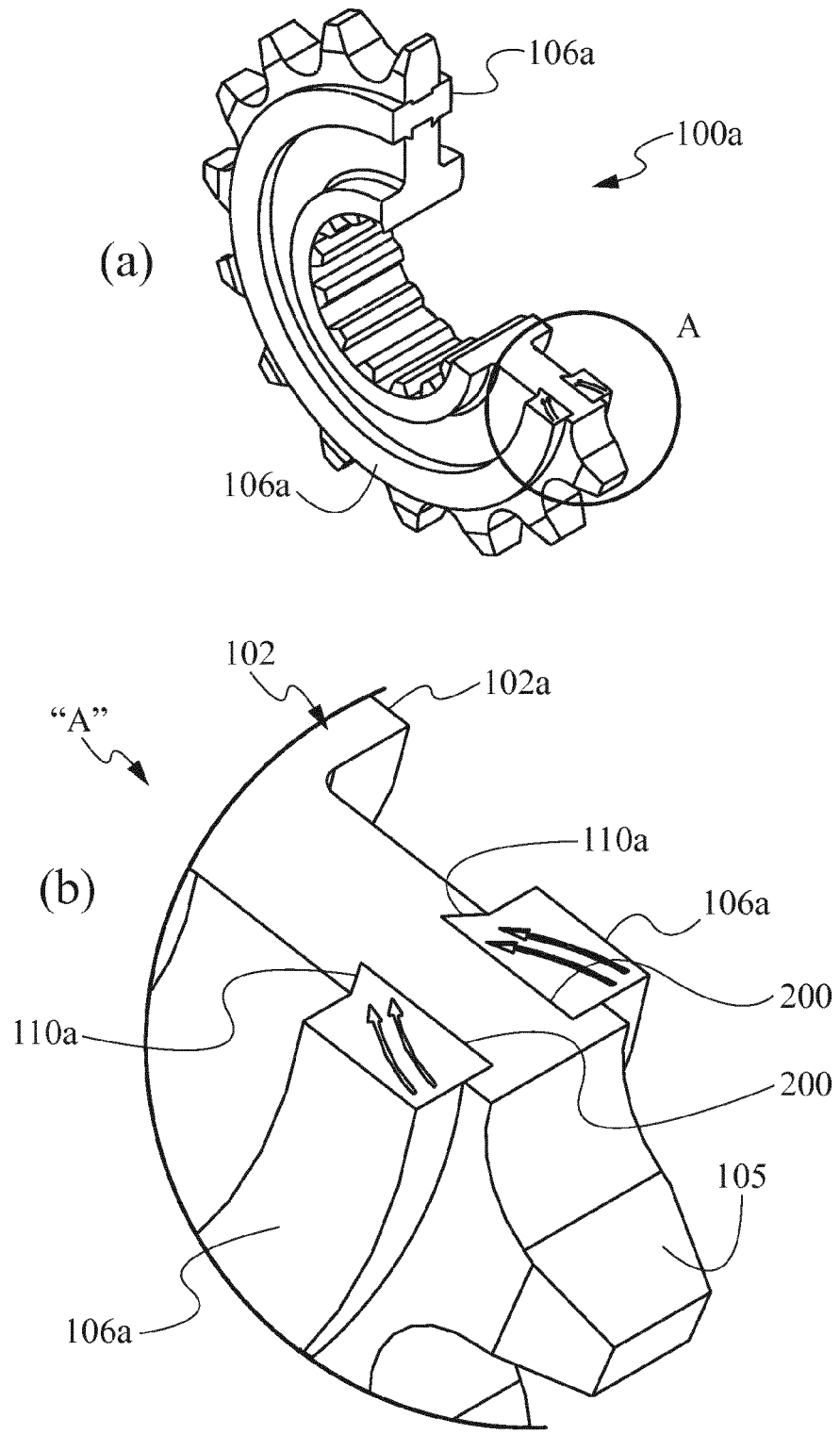
FIG. 8(a): similar view to FIG. 7(a), but with a channel (annular recess) of different shape.
FIG. 8(b): similar view to FIG. 7(b), but with a channel (annular recess) of different shape.

FIG. 8 shows an alternative embodiment (or variant) of the present invention applied to pinion 100a in which the profile of the step that receives the chain pressure is wedge shaped. Such wedge shaped circular step, shown by number 100a in FIG. 8(b), allows optimizing the pressure absorption action exerted by the chain. Obviously, other types of profiles/cross sections of the bilateral channel 200 can occur to a man skilled in the art, without applying any inventive effort. All these variants are therefore comprised in the same inventive concept of the present invention. The two pairs of arrows in FIG. 8(b) indicate the transmission of forces towards the steps situated on the two respective sides of the silenced sprocket according to the present invention.

FIG. 8 also deals with a pinion with two lateral hubs, exactly like in FIG. 7.

Figure 9:
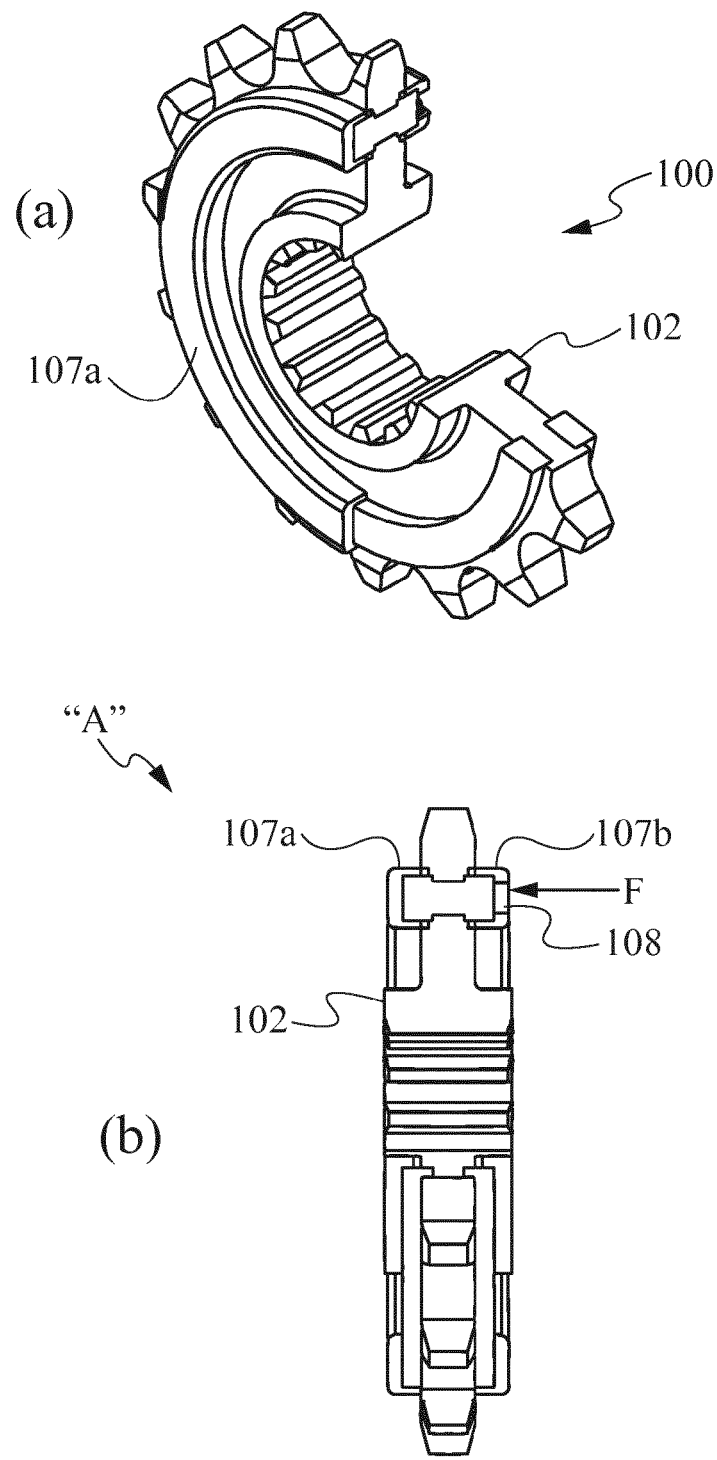
FIG. 9(a), (b): the invention mold and the vulcanization method according to the present invention, for the pinion in FIG. 7.

In FIG. 9 (FIGS. 9(a) and 9(b)) the innovative mold and the vulcanization technique are shown, according to the present invention. These innovations are described in the application example concerning again pinion 100 for motorcycles, modified according to the present invention, that is with the bilateral channel 200. The bilateral channel allows for the vulcanization of only the surface where the rubber is required, thus allowing a considerable reduction of the rubber volume required. For example, vulcanizing the same identical pinion of FIG. 2 (which however lacks the bilateral channel 200) and achieving the same noise absorption, the volumetric value of the NBR rubber will be ⅔ less in FIG. 9 (present invention) compared to the volume of NBR rubber of the traditional pinion 1 in FIG. 2. Therefore, according to the present invention (FIGS. 6,7,8,9), thanks to the presence of the steps created by the circular recesses 200, annular support surfaces are created for the rubber, which allow to reduce considerably the quantity of silencing material (rubber) used. The diameter and depth of the hub are inconsequential with this technology, therefore ignored. This allows to use—according to the present invention—particular molding devices (also simply named "molds"), as clearly shown in FIG. 9, which are more versatile since they don't depend (in contrast to the molding devices 7a,b of traditional type in FIG. 3) on the hub height/depth or its diameter.

Specifically, said molding devices 107a, 107b (FIG. 9) create channel-shaped rings (one of which with an injection hole 108) with width adapted to the width of the circular recesses 200, where the edges of the means 107a, 107b which are in contact with the surface of pinion 100 are rectified in order to ensure optimal tight seal during the injection molding.

Figure 1:
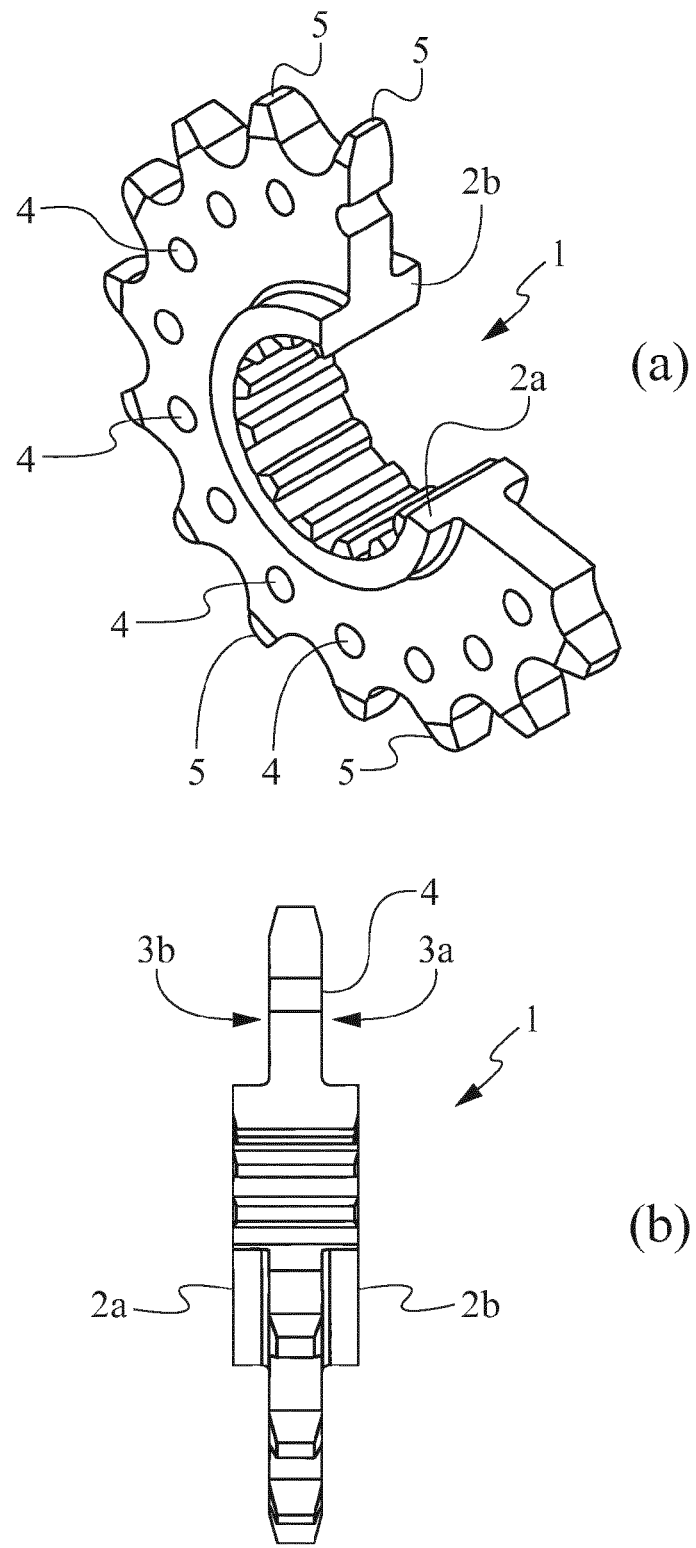
FIGS. 1-5: the sprockets of the known art, as well as their vulcanization methods, as described above.
Figure 2:
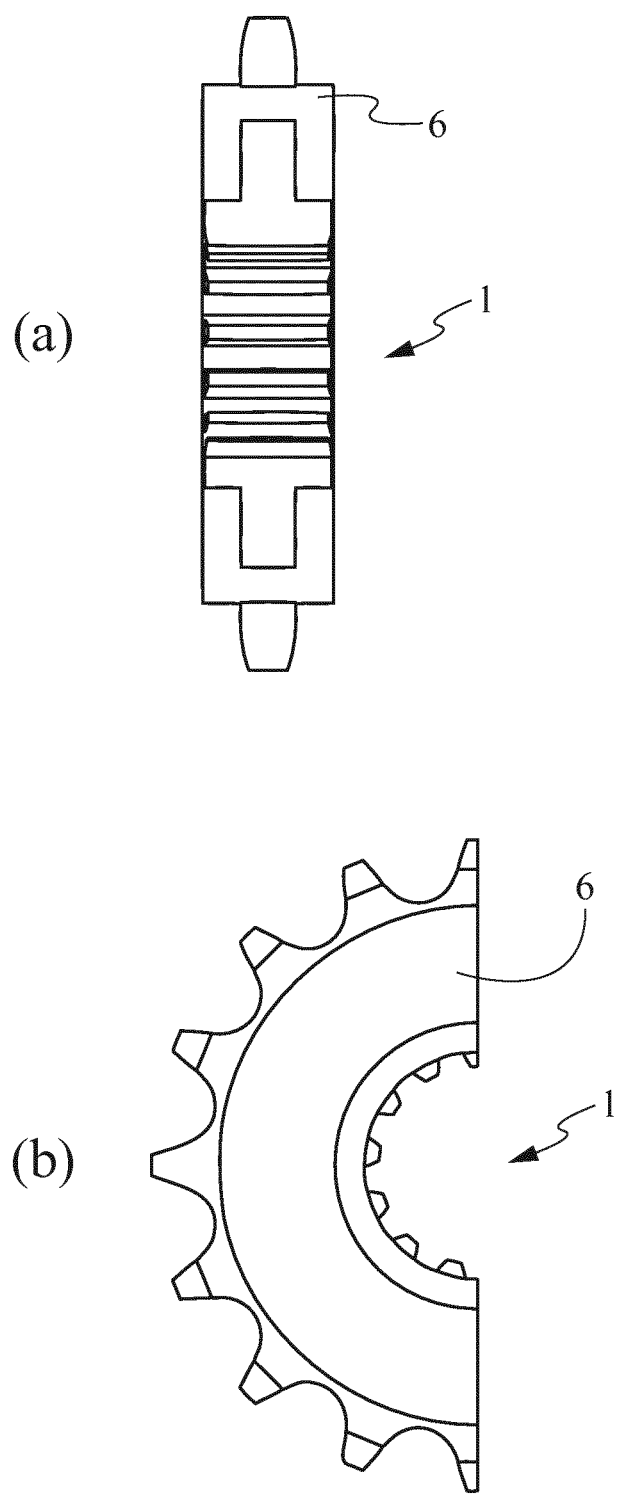
Figure 3:
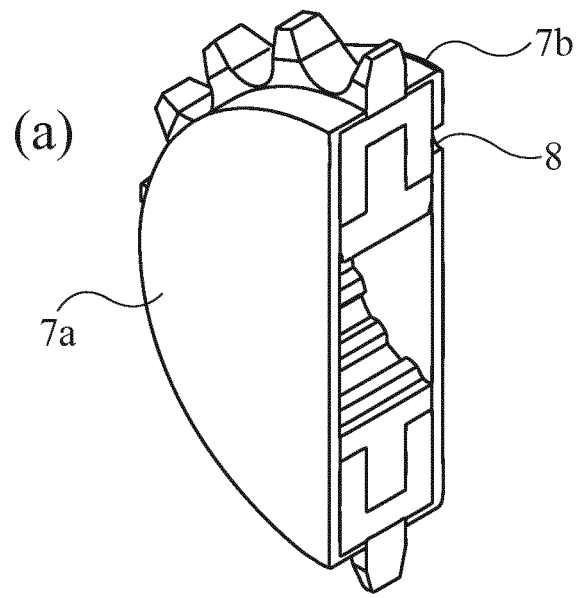
Figure 3:
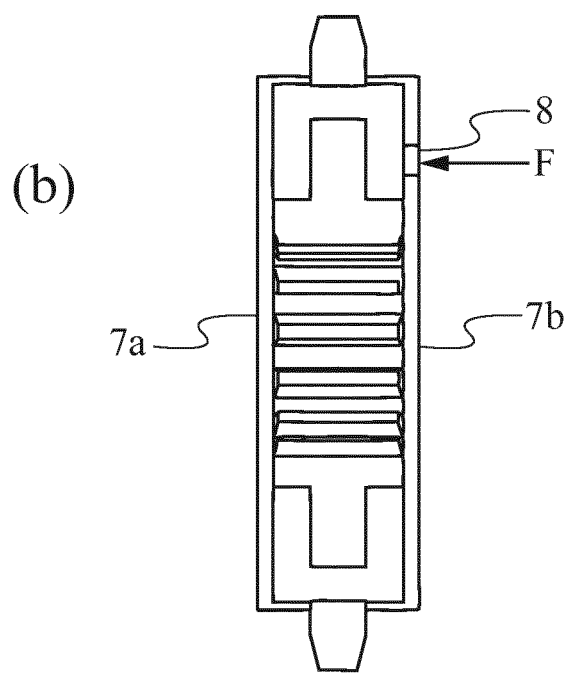
Figure 4:
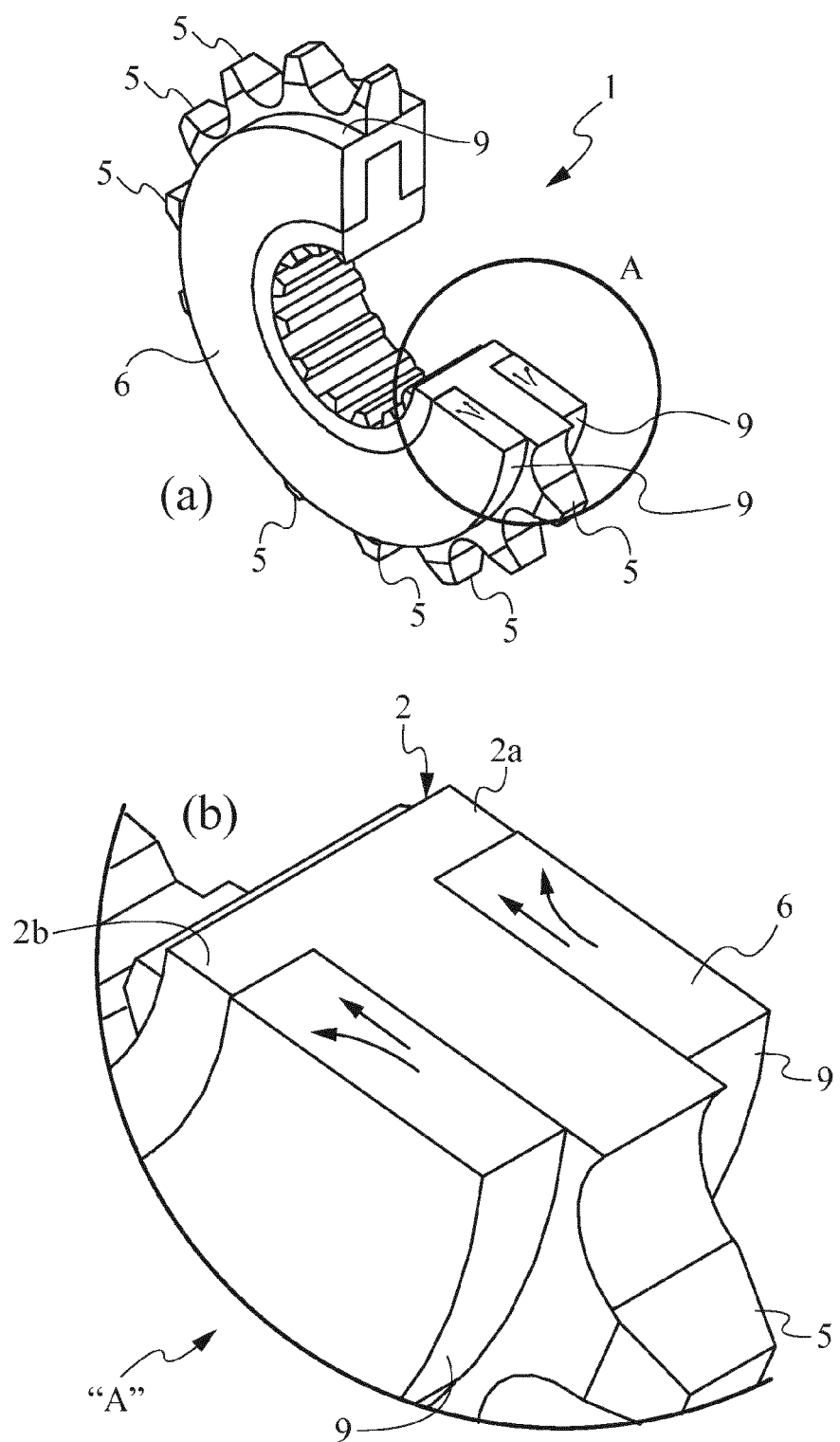
Figure 5:
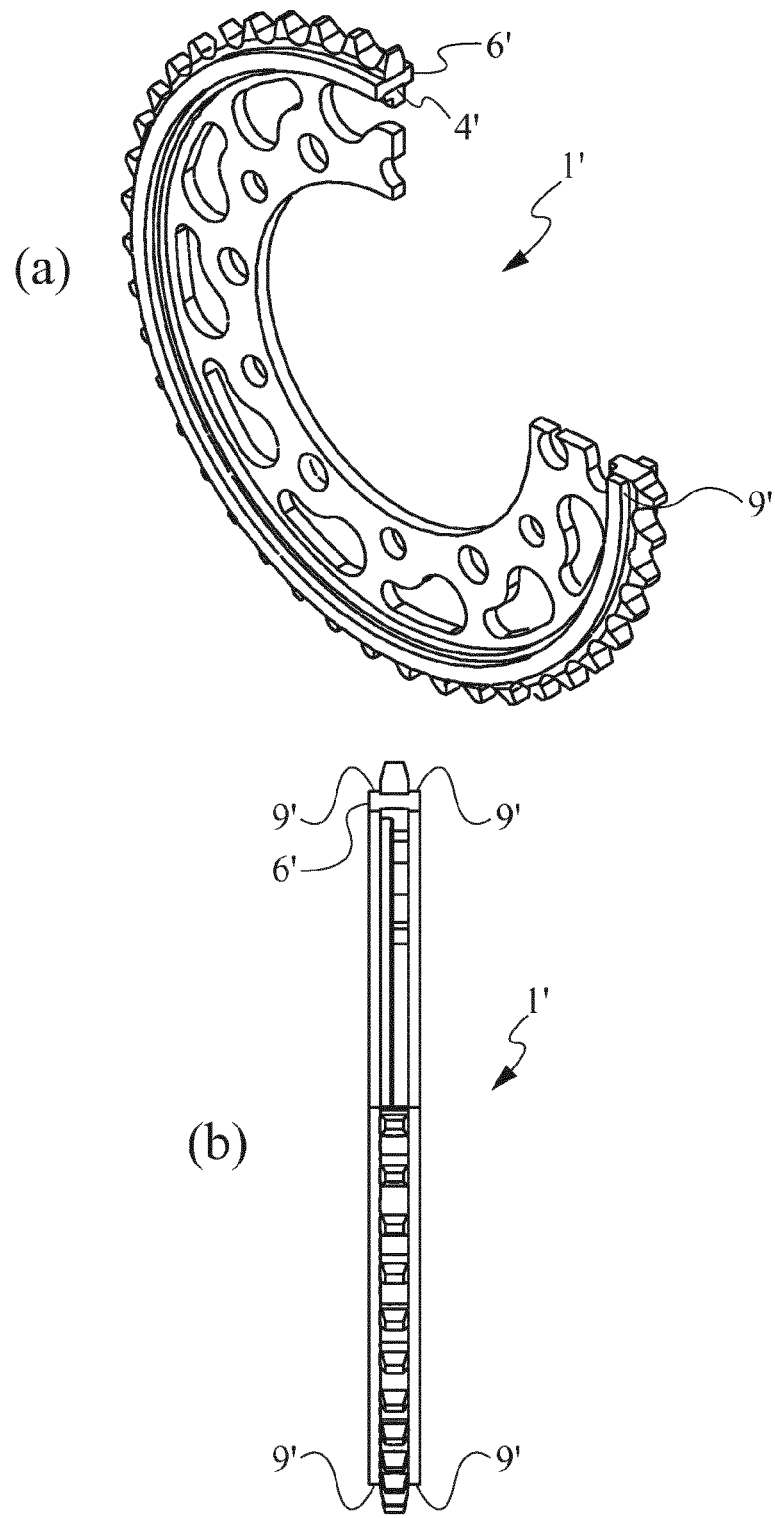

In conclusion, in all cases (pinion in FIGS. 6 to 9), in contrast to the known art, the present invention allows to avoid the lateral rubber disks shown in FIG. 2, which extend to the hub in order to create a support base. This allows using less material (less pollution!) and more versatile and adaptable molds.

The advantages of the present invention are more obvious when this is applied to a motorcycle toothed crown (drive sprocket), and in general to sprockets lacking a central hub.

Figure 10:
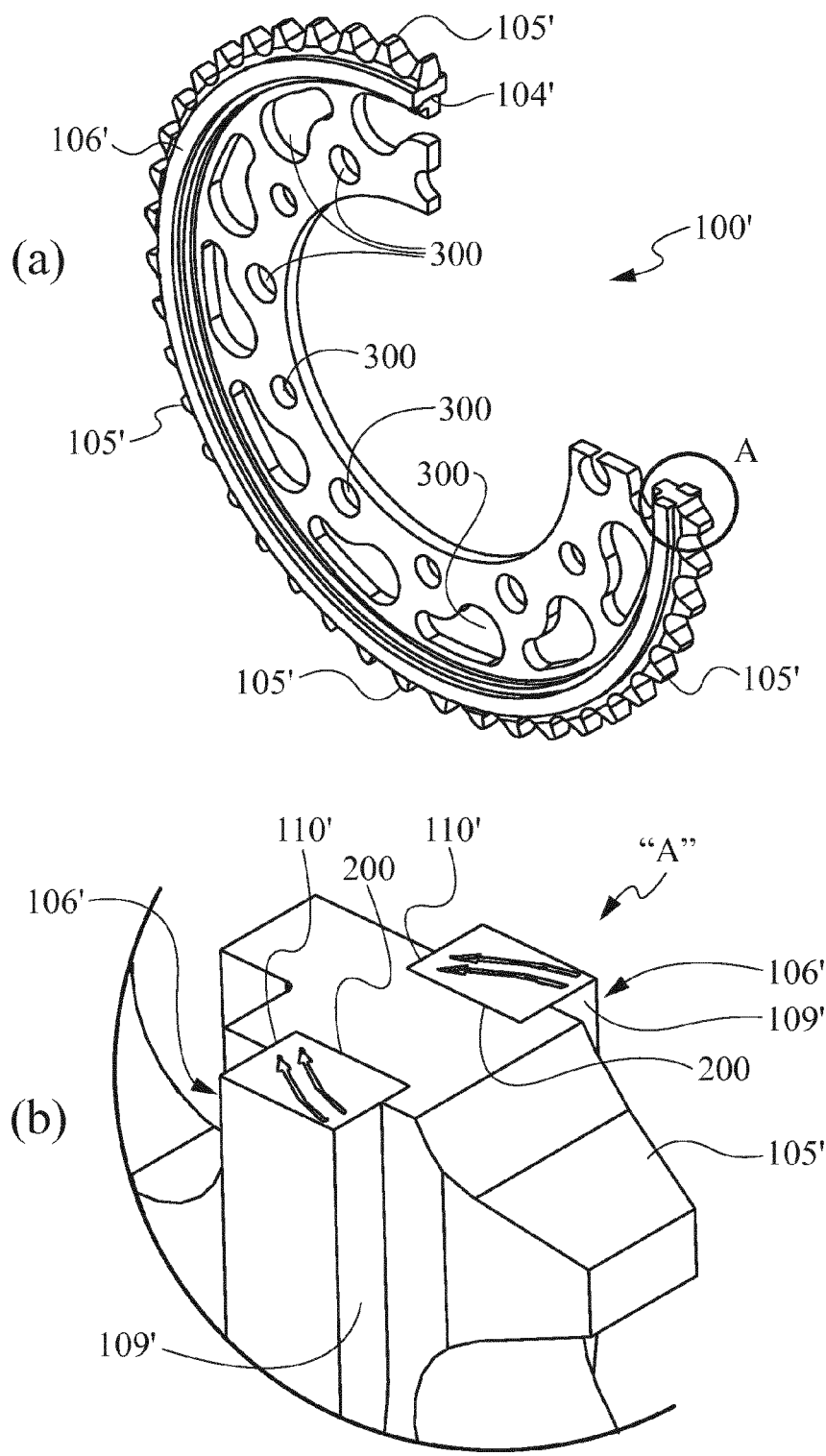
FIGS. 10(a), (b): a toothed crown silenced according to the present invention, viewed in a partial perspective view (cross section) and in an enlarged detail (as highlighted in circle "A" in FIG. 10 (a)) respectively.
Figure 11:
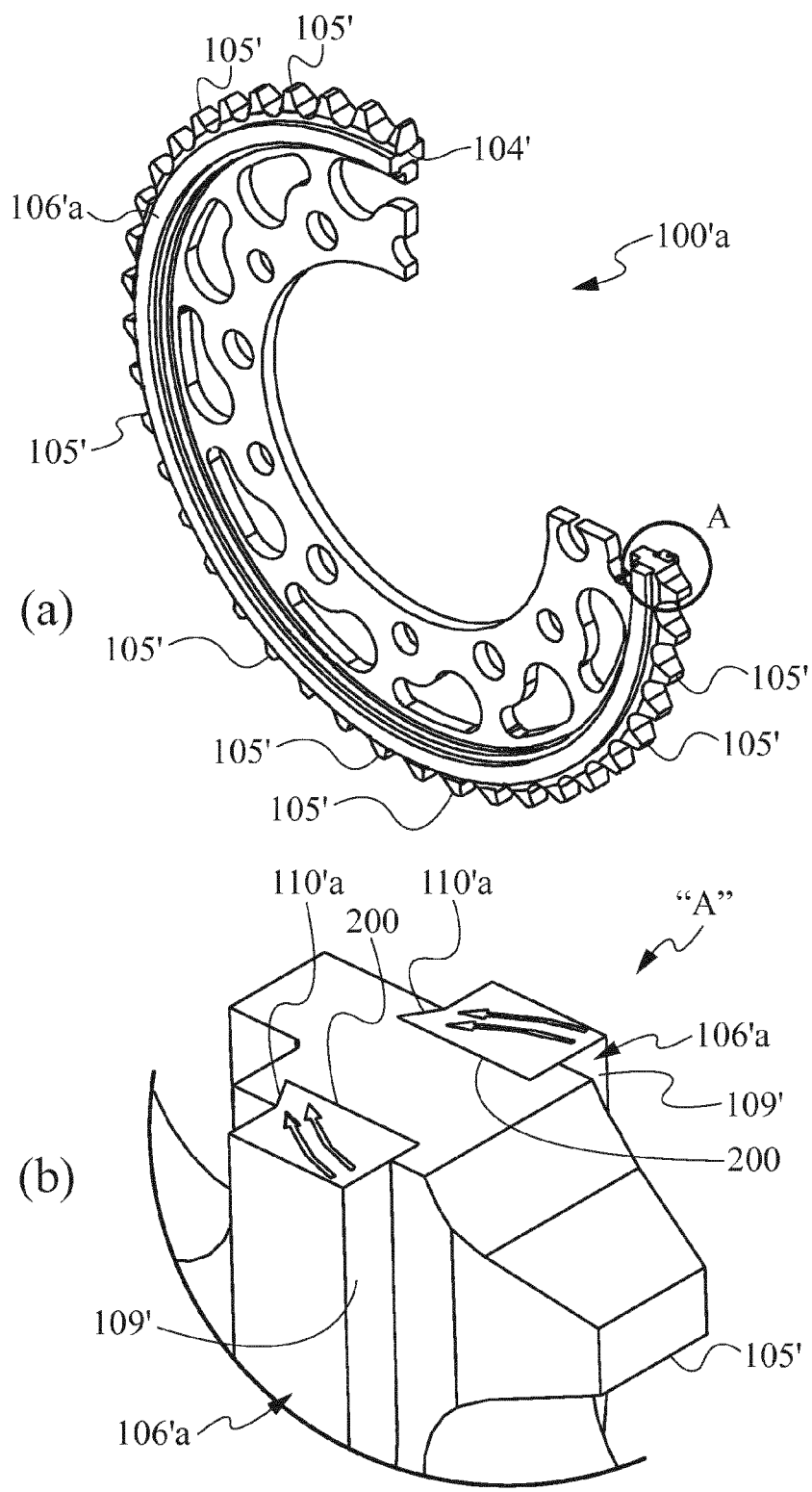
FIGS. 11(a), (b) similar views to FIG. 10, but with a bilateral channel (annular recesses) of different profile or shape.

The last figures, FIGS. 10 and 11, refer to this last issue. They show how toothed crown 100' and 100a' respectively present a bilateral channel 200, or in other words two circular recesses 200 on the respective "tooth sections" (on both sides of the toothed crown).

The two toothed crowns 100' and 100' a differ in the profile of the cross section of the channels (the first rectangular, wedge shaped the other). The respective enlarged details "A" of FIGS. 10(b) and 11(b) show the same functional principle and the same inventive concept enunciated and described before, but is important to note that in the case of a toothed crown (without a hub) the present invention permits for the first time to obtain a real "silent sprocket", whose operation is guaranteed for a long period of time and in the case of a motorcycle amply exceeds the period required for the certification tests. This permits to prolong the toothed crown usage time period. A transmission block composed of O-ring chain and silenced sprockets (pinion and toothed crown) according to the technique of the present invention permits to reach noise values comparable to a belt transmission. Therefore also the noise containment efficiency is optimal.

Silenced Sprockets for Industry

The sprocket size can be larger, and their thickness greater than those of the sprockets dealt with up to now, therefore an infinite range of profiles (channels) can be used in order to optimize the rubber resistance. The noise in working environments with a high concentration of chain driven plants (product transportation-handling, manufacturing, packaging etc.) is annoying and often protested. The manufacturers of such plants are always busy developing increasingly silent systems. The possibility of supplying them with silenced sprockets is therefore a great opportunity to reduce the noise in working environments.

INVENTION SYSTEM ADVANTAGES

1. Maximized construction simplicity;
2. A unique mold for a specific pitch and toothing (reduced mold cost);
3. Total reliability both on a pinion (sprocket with a hub) and on a toothed crown (sprocket without a hub);
4. Less pollution by reducing the volume of rubber required;
5. The construction principle allows to produce silenced sprockets for the entire industrial field;
6. Possibility of channel profile modification in order to increase the loads;

The invention claimed is:

1. A silent sprocket/gear of the toothed crown type without a hub, comprising a circular disc-shaped metal body having a plurality of peripheral teeth and a center with a central hole, further comprising an elastic silencing member applied by means of injection molding on the metal body of the silent sprocket/gear;

said elastic silencing member is extended on each side of the metal body, in an area arranged all around the center, starting from a substantially circular ideal line and directly adjacent to the base of said peripheral teeth;

said elastic silencing member passes through a plurality of through openings obtained in the metal body and arranged in said area; and said elastic silencing member projects laterally with respect to the metal body, forming, on each side of the silent sprocket/gear, respective peripheral outer circular cylindrical surfaces facing a radial direction, which surfaces are adapted to come in contact with a transmission chain, wherein in the metal body, in each of said areas of each side, the surface of the respective area forms a depression with respect to an immediately adjacent surface of the metal body, so as to create at least one inner step for support of the pressures that can be exerted by the chain and transmitted to the elastic silencing member through its peripheral outer circular cylindrical surfaces, and wherein the said area forms, on each side in the metal body, a circular channel with constant cross-section, which is extended all around said center of the metal body, that receives the elastic silencing member, wherein said through holes occupy a width-wise distance in a radial direction, inside the circular channel, which corresponds almost to the entire width of the circular channel itself.

2. The silent sprocket/gear according to claim 1, wherein said through openings are equidistant through holes distributed in a concentric manner with respect to the center of the sprocket/gear.

3. The silent sprocket/gear according to claim 1, wherein the profile of the section of the circular channel is rectangular.

4. The silent sprocket/gear according to claim 1, wherein the profile of the section of the circular channel is wedge-like or dovetail-like.

5. The silent sprocket/gear according to claim 1, wherein the elastic silencing member is radially extended inwardly towards the center and the central hole of the metal body, starting from a distance of about 1 mm measured from the base of the teeth.

6. The silent sprocket/gear according to claim 1, wherein the material of the silencing member is nitrile rubber NBR.

7. The silent sprocket/gear according to claim 1, wherein said circular channel is extended width-wise for a minimum distance such that said circular channel has a width of at least one order of magnitude smaller than the primitive radius of the sprocket/gear that is measured from the center to the circumference of the primitive circle of the toothed crown sprocket/gear without a hub.

8. The silent sprocket/gear according to claim 1, wherein said through holes occupy a width-wise distance in a radial direction, inside the circular channel, which corresponds almost to the entire width of the circular channel itself.

9. The silent sprocket/gear according to claim 1, wherein said elastic silencing member forms a thin strip on each side of the sprocket/gear, having a width of about ½ cm and a depth/projection of at least 1 mm.

10. The silent sprocket/gear according to claim 1, further comprising undercut openings.

11. The silent sprocket/gear according to claim 1, wherein said elastic silencing member forms a single rubber body, with rubber pins that pass through the through holes.

12. A silent sprocket/gear constituting a pinion with a central hub, comprising a circular disc-shaped metal body bearing a plurality of peripheral teeth and a center with a central hole in the hub, further comprising an elastic silencing member applied by injection molding on the metal body of the silent sprocket/gear;
    said elastic silencing member is extended on each side of the metal body, in an area arranged all around the center starting from a substantially circular ideal line directly adjacent to the base of said peripheral teeth;
    said elastic silencing member passes through a plurality of through openings obtained in the metal body and arranged in said area;
    said elastic silencing member projects laterally with respect to the metal body, forming on each side of the silent sprocket/gear respective peripheral outer circular cylindrical surfaces facing a radial direction, which surfaces are adapted to come in contact with a transmission chain, wherein in the metal body, in each of said areas of each side, the surface of the respective area forms a depression with respect to an immediately adjacent surface of the metal body, so as to create at least one inner step for support of the pressures that can be exerted by the chain and transmitted to the elastic silencing member through its peripheral outer circular cylindrical surfaces, and that said inner step is arranged at a set distance from the hub in such a manner that a substantially planar annular surface is present between said inner step and the hub of the sprocket/gear or pinion, on each side, and wherein the said areas form, on each side of the sprocket/gear, a circular channel in the circular disc-shaped metal body, with constant section and with rectangular, wedge-like, dovetail-like or other profile, that receives the elastic silencing member.

13. The silent sprocket/gear according to claim 12, wherein said through openings are equidistant through holes distributed in a concentric manner with respect to the center of the sprocket/gear or the hub.

14. The silent sprocket/gear according to claim 12, wherein the elastic silencing member is radially extended inwardly towards the hub and the central hole thereof, starting from a distance of about 1 mm measured from the base of the teeth.

15. The silent sprocket/gear according to claim 12, wherein the material of the silencing member is nitrile rubber NBR.

16. The silent sprocket/gear according to claim 12, wherein said circular channel is extended in width for a minimum distance such that said circular channel has a much smaller width than the primitive radius of the sprocket/gear that is measured from the center to the circumference of the primitive circle.

17. The silent sprocket/gear according to claim 12, wherein said elastic silencing member forms a single rubber body, with rubber pins or members that pass through the through openings or the through holes.

* * * * *